United States Patent

[11] 3,619,772

| [72] | Inventor | David M. Ellis<br>South Burlington, Vt. |
|---|---|---|
| [21] | Appl. No. | 854,197 |
| [22] | Filed | Aug. 29, 1969 |
| [45] | Patented | Nov. 9, 1971 |
| [73] | Assignee | Burroughs Corporation<br>Detroit, Mich. |

[54] MAGNETOMETER EMPLOYING MEANS RESPONSIVE TO VARIATIONS OF MAGNETIZATION VECTOR POSITION IN A THIN FILM SENSOR
20 Claims, 11 Drawing Figs.

| [52] | U.S. Cl. | 324/43 R, |
| | | 340/174 TF |
| [51] | Int. Cl. | G01r 33/02 |
| [50] | Field of Search | 324/43 R, |
| | | 47, 34 R; 340/174 TF |

[56] References Cited
UNITED STATES PATENTS

| 2,975,360 | 3/1961 | Bell | 324/43 |
| 3,254,298 | 5/1966 | Ellis et al. | 324/34 |

FOREIGN PATENTS

| 592,241 | 9/1947 | Great Britain | 324/43 |

*Primary Examiner*—Rudolph V. Rolinec
*Assistant Examiner*—R. J. Corcoran
*Attorney*—Carl Fissell, Jr.

ABSTRACT: A thin magnetic film magnetometer is described in which the thin film sensor element is driven in both its easy and hard axes directions by oscillators having different frequencies. The nature of the signal appearing on a winding coupled to the thin film along its easy direction depends upon the angular position of the thin film magnetic moment or magnetization (M) vector and the film easy axis; which in turn is a function of an external field applied to the film along its hard axis. Both manual and automatic means are described for sensing the position of the M vector and restoring it to its rest position along the thin film easy axis—such action producing a measure of the magnitude and direction of the external applied field.

INVENTOR.
DAVID M. ELLIS

BY Francis A. Varallo
AGENT

INVENTOR.
DAVID M. ELLIS

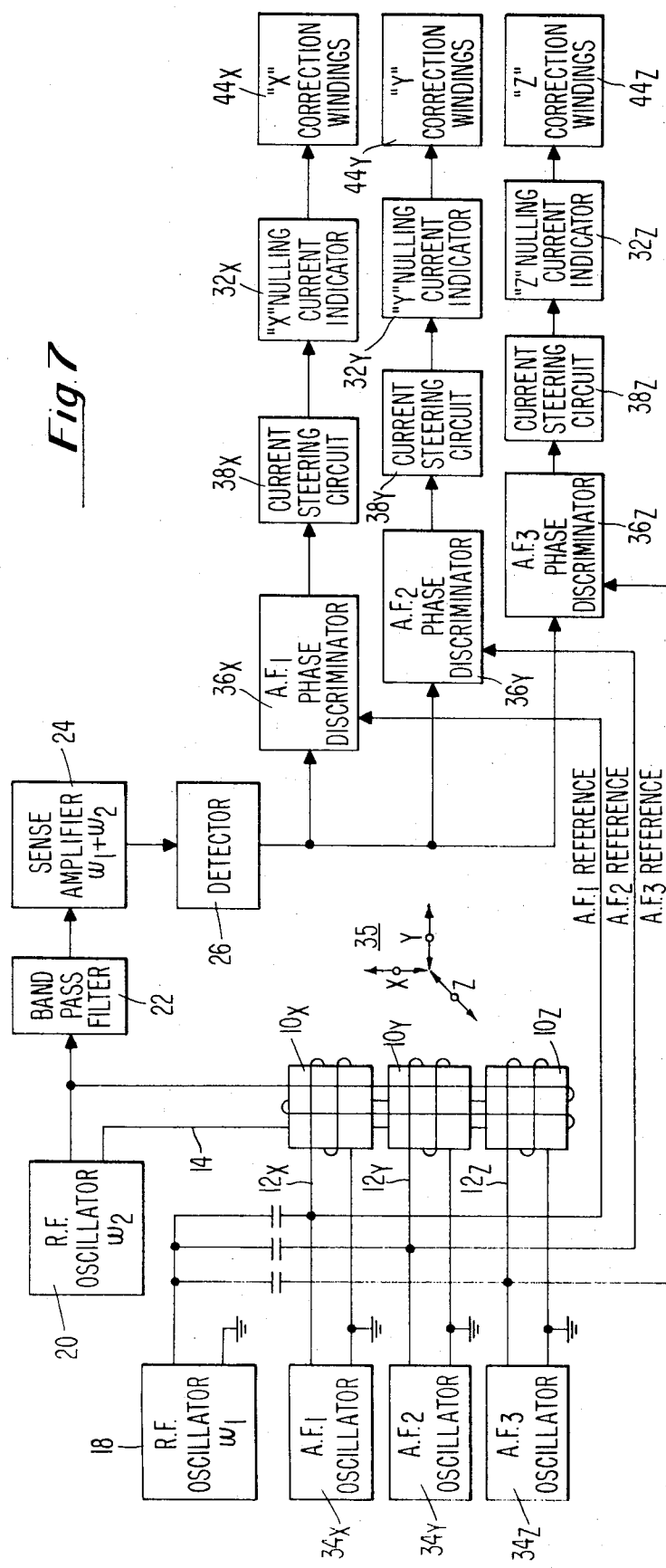
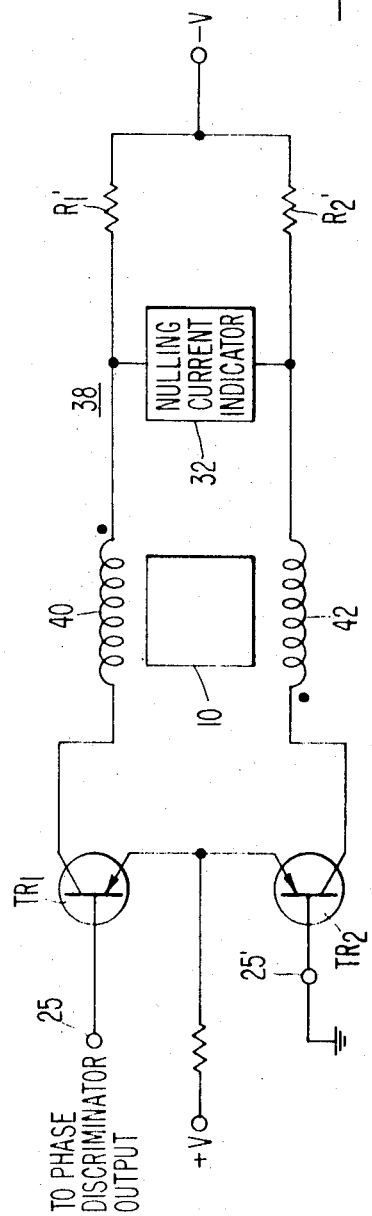

MAGNETOMETER EMPLOYING MEANS RESPONSIVE TO VARIATIONS OF MAGNETIZATION VECTOR POSITION IN A THIN FILM SENSOR

CROSS-REFERENCE TO RELATED APPLICATIONS

The present application is broadly related to application Ser. No. 307,651, which has matured into U.S. Pat. No. 3,254,298, entitled "Instrument for Measurement of Thin Magnetic Film Parameters" by David M. Ellis and Clifford J. Bader. This patent is assigned to the same assignee as the present application. In the patent there is described and claimed an instrument which relates magnetization vector position in a thin magnetic film to radiofrequency (RF) mixing behavior under a crossed-wire probe positioned in close proximity to the film. As referred to in said patent, a rigorous mathematical derivation of the equations relating to the operation of the instrument are found in the appendix of a technical paper entitled "Instrument for Observation of Magnetization Vector Position in Thin Magnetic Films," authored by the patentees and published in the Review of Scientific Instruments, Vol. 33, No. 12, pages 1,429–1,435, Dec. 1962.

BACKGROUND OF THE INVENTION

The measurement of the strength and direction of very small magnetic fields including the earth's field, and changes which occur therein, continue to be of prime importance in the scientific field. Although a large number of prior art techniques are known for measuring such fields, the vast majority of these entail delicate, complex instruments which require either very rigid control of the material utilized in their construction, or elaborate compensation and balancing arrangements.

The present device, which includes thin magnetic films in a unique circuit configuration, fills the need for an ultrasensitive magnetometer possessing mechanical ruggedness, simplicity of design, small physical size, and minimal electrical power requirements.

SUMMARY OF THE INVENTION

In accordance with the present invention there is provided a sensing element comprised of a thin ferromagnetic film of nickel-iron alloy and having uniaxial anisotropy. Easy and hard direction windings are coupled to the thin film element and are driven respectively by radiofrequency oscillators having different frequencies. The radiofrequency (RF) fields applied to the elements are controlled in magnitude such that the magnetization of the element is disturbed but not permanently altered in state. Restated, care is exercised to assure that the thin magnetic film is not switched from one of its remanent states to the opposite state in response to the action of the RF fields.

The output of the thin film sensing element at the sum of the two RF oscillator frequencies is observed on the easy direction winding. It has been shown in the reference patent that the output of the sensing element is zero when the thin film magnetization vector is parallel with the easy axis. If an external magnetic field is applied to the thin film element in the hard direction, the magnetization vector deviates from its position parallel with the easy axis, thereby resulting in a corresponding output from the sensing element.

Utilizing this concept, the embodiments of the present invention to be described in detail hereinafter, provide two modes of determining the magnitude and direction of the external applied field. A first basic mode may be characterized as "manual" in that DC current is made to flow in an additional hard direction winding coupled to the magnetic element in the proper direction and magnitude to counteract the effect of the external field, and to return the M-vector to its rest position parallel to the easy axis. The amplitude and polarity of the DC current are a measure of the strength and direction of the unknown external field.

In a second "automatic" servo type mode of operation, an audio frequency field is applied to the thin film sensing element, thereby resulting in an output voltage from the element which varies at an audio frequency rate. Through the use of a phase detector or discriminator, the audio frequency modulation of the RF output, provides the information needed to control the flow of current in a current steering circuit. The latter circuit causes current flow through additional hard direction coils or windings, thereby providing fields in opposition to the applied external field. The amplitude and polarity of the current flow in the last-mentioned windings is a measure of the strength and direction of the applied field.

The inventive concepts inherent in the measurement of unknown magnetic fields in one direction are also applied to a magnetometer sensitive to fields in three orthogonal directions, in the manner to be described in detail hereinafter.

BRIEF DESCRIPTION OF THE DRAWING

FIG. 6 is a schematic diagram of a current steering circuit for use with the discriminator of FIG. 4.

FIG. 7 is a block diagram representative of a three-axis magnetometer representing an extension of the principles inherent in the single-axis magnetometer of FIG. 2.

DESCRIPTION OF THE PREFERRED EMBODIMENTS

Figure 1:
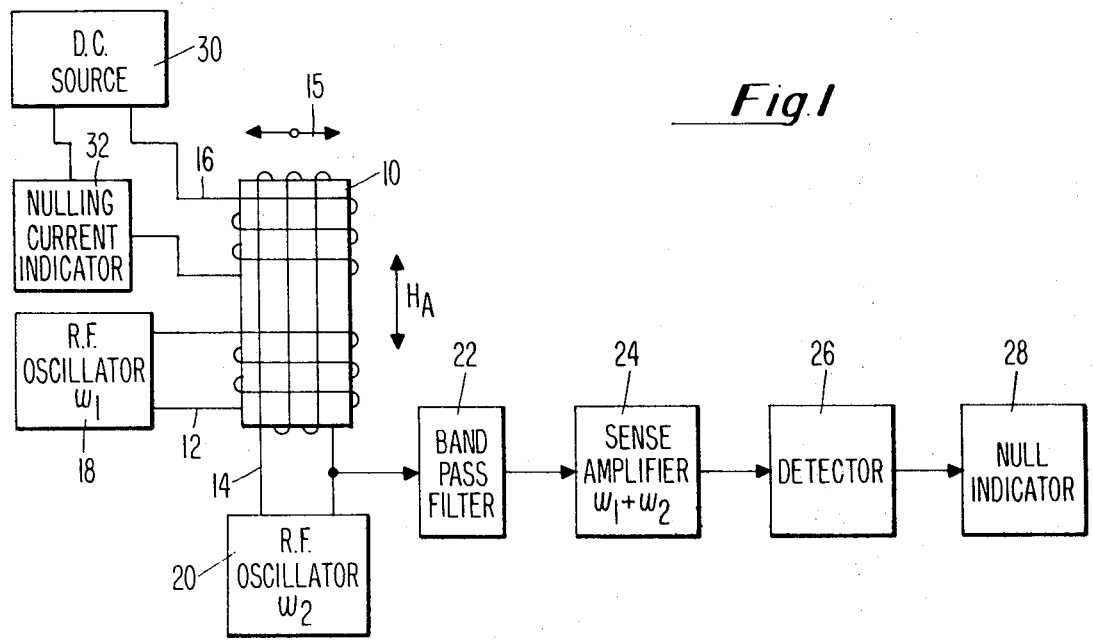
FIG. 1 is a block diagram representation of one form of the magnetometer of the present invention.

With reference to FIG. 1, there is depicted a thin magnetic film 10, having windings 12, 14 and 16 inductively coupled thereto. Although the thin film 10 is illustrated as being rectangular, other shapes may be used with satisfactory results and the invention should not be considered limited thereto. The easy axis or preferred direction of magnetization of the film is indicated by the doubled headed arrow 15. The external field or magnetic environment to which the film is subjected is indicated by $H_A$, which is directed along the hard axis of the film element. Before proceeding with a detailed description of the present invention, it may be advantageous to consider briefly the nature of the magnetic films and their magnetic rotation employed in the present invention.

Thin magnetic films have been produced by depositing a nickel-iron alloy on a smooth substrate, such as glass, to a thickness of a few hundred to several thousand Angstroms. A number of deposition processes, including evaporation in a vacuum and electroplating, may be employed. In the evaporation process the deposition of the magnetic material on a glass substrate may be made directly, whereas electroplating on a glass substrate requires the application of a conductive coating on the glass prior to deposition. In general, the characteristics discussed hereinafter apply to films deposited by either of these processes, although in electroplated films consideration must be given to the possible high frequency eddy current effect in the required conductive underlayer.

In general, predictable and stable magnetic properties of the films are obtained by choosing an alloy composition which yields minimum magnetostriction coefficient. For the nickel-iron film the optimum composition appears to be approximately 83% Ni, 17% Fe. It has been found experimentally that if the actual composition of the films differs from this ratio by more than a few percent, the film magnetic properties are unduly sensitive to stresses induced by thermal expansion of the substrate or by external forces.

Films of thicknesses up to at least 3000 Angstroms exhibit the capability of existing as a single domain, the magnetization of which can be rotated from a preferred or easy direction of magnetization by the application of external fields. This easy axis anisotropy is produced in the films by the presence of a large uniform field during the evaporation process which causes the magnetic domains of the alloy to align in a preferred direction.

Thus, thin film magnetic films possess small dipole moments which, due to exchange energy and a single axis of anisotropy, are easily aligned and remain stable along a common axis. The dipole moments aligned to form a domain which may be represented by the moment or magnetization vector M. M represents the magnitude and direction of the flux within a particular region or volume of the ferromagnetic material. The quiescent position of M occurs where the resultant of torque imposing forces is zero, that is, where the energy is a minimum. For the case of a single domain having no external field applied, the quiescent position of M is along the axis of anisotropy, but in either one of two opposite directions. These directions are commonly designated the (+) and (−) states respectively. Any external field applied to M which has a component directed transverse to M, will produce an unbalance torque on M. M will rotate until its direction is such that the unbalanced torque becomes zero.

Returning to a consideration of FIG. 1, a winding 12 is placed around a thin magnetic film 10 in such a manner that the coil axis coincides with the hard direction axis of magnetization of the film. Winding 14 is placed around the film 10 with its coil axis coinciding with the preferred or easy axis of magnetization. It should be understood that the windings, such as 12, 14 and 16 of FIG. 1, as well as those depicted in the other FIGS. have been drawn to illustrate the proper directional orientation thereof with respect to the thin film easy axis. The drawings are not intended to represent the optimum physical placement of the windings on the thin film element, which if illustrated, would render the drawings less clear. In practice, it is essential that the windings be physically oriented with respect to one another and the thin film element such that the magnetic fields generated thereby occupy the same volume of space. Moreover, care is taken to avoid capacitive coupling between the RF windings (12 and 14) and the DC windings (for example, 16). Although winding 16 of FIG. 1 is shown wound around one extremity of the thin film element 10, in one embodiment it is a solenoid physically encompassing an assembly of the thin film element and windings 12 and 14. The latter windings are placed directly upon the film and each other. Alternately, with the same basic assembly, winding 16 may consist of a set of Helmholtz coils arranged to produce a uniform field over the area of the film.

Windings 12 and 14 are shown connected respectively to two RF oscillators 18 and 20 operating at individual frequencies of $\omega_1$ and $\omega_2$. Except for the output frequencies, the oscillators may be substantially identical, and of conventional design. For example, a crystal controlled Pierce oscillator circuit operating fully class C in the 10 to 20 MHz. region may be successfully employed. Care should be taken to select oscillator frequencies in which the second harmonics are each sufficiently separated from the sum-frequency component ($\omega_1+\omega_2$) of the flux change being sensed, as will be considered in greater detail hereinafter. Moreover, the combination of the high order odd harmonics of the fundamental oscillator frequencies should not produce difference frequencies within the range of the sensed signal. The current flow through windings 12 and 14 is carefully controlled so that the RF fields applied to the thin film element are of such magnitude that the magnetization of the element is merely disturbed and not irreversibly altered.

The excitation of the thin magnetic film 10 by the small RF magnetic fields of different frequencies causes combinatorial components of flux to be generated, that is, sum and difference frequency components. Although either component could be used, the sum-frequency component was chosen in the present embodiment because for any two selected RF oscillator frequencies, $\omega_1$ and $\omega_2$, the latter component yields a larger output voltage signal. The flux component at the sum-frequency is sensed by one of the RF windings, namely 14, which therefore also serves as a sense conductor.

The voltage signal induced in winding 14 by the sum-frequency component passes through a band pass filter 22, sense amplifier 24 and detector 26, and is applied to a null indicator 28 for visual display of its amplitude.

The band pass filter 22 is designed to transfer only the desired output signal, for example, ($\omega_1+\omega_2$), from the sense winding 14 to the sense amplifier 24. The sense amplifier 24 may include several stages of amplification, the last stage driving a detector 26 which in its simplest form may be a germanium diode. The detector stage is designed to operate with the null indicator 28, which may be a vacuum tube voltmeter. All of the foregoing stages, from the band-pass filter to the null indicator, are well known to electronic circuit designers, and their design for specific use in the present magnetometer is well within the ordinary skill of such designers.

As has been described in the referenced U.S. Patent No. 3,254,298, and expressed mathematically in the referenced technical paper "Instrument for Observation of Magnetization Vector Position in Thin Magnetic Films," The sum-frequency output voltage appearing on a sense winding is zero when the magnetization (M) vector of the thin film element is parallel with the direction of the sensed flux. Thus, in the absence of an external field $H_A$, the output voltage at the sum-frequency appearing on the easy direction winding 14 is zero and the null indicator 28 gives visual display of the null condition. The referenced patent and publication further teach that the magnitude and phase of the sensed flux depend upon the angle between the M-vector and the film easy axis.

An external field $H_A$, or a field component, applied perpendicular to the M-vector, that is, along the film hard direction axis, tends to cause a rotation of the M-vector away from the easy axis. FIG. 1, illustrates an additional winding 16 coupled to the thin film element 10 and having its coil axis lying along the hard direction axis of magnetization. A DC source 30 capable of causing current flow in either direction through winding 16 is also provided. The magnitude and the sense of the hard direction correction field applied to film element 10 is a function of the amplitude of current provided by DC source 30 and flowing through winding 16.

To illustrate the operation of the magnetometer of FIG. 1, it will be assumed that an external magnetic field ($H_A$) whose magnitude and direction are to be determined, is applied to the thin film element 10 along its hard axis of magnetization. The null indicator 28 will indicate a shift from its null position in response to the applied field. At this time, DC source 30 is actuated and the current flowing in winding 16 is adjusted to generate a field which exactly opposes $H_A$. Current flow in winding 16 is measured by a nulling current indicator 32 which may be an ammeter designed to measure current in either direction. When the field generated by current flow in winding 16 exactly cancels $H_A$, as indicated by the null reading of indicator 28, the M vector will have returned to its rest position, parallel to the easy axis. The current amplitude and polarity indicated by nulling current indicator 32 is a measure of the unknown field $H_A$. With knowledge of the winding 16 parameters and the current amplitude registered by indicator 32, the field strength of $H_A$ may be computed. Alternately, the magnetometer may be calibrated by relating the current in winding 16 to that necessary to cancel a known magnetic field applied to the film in the same direction as $H_A$.

Figure 2:
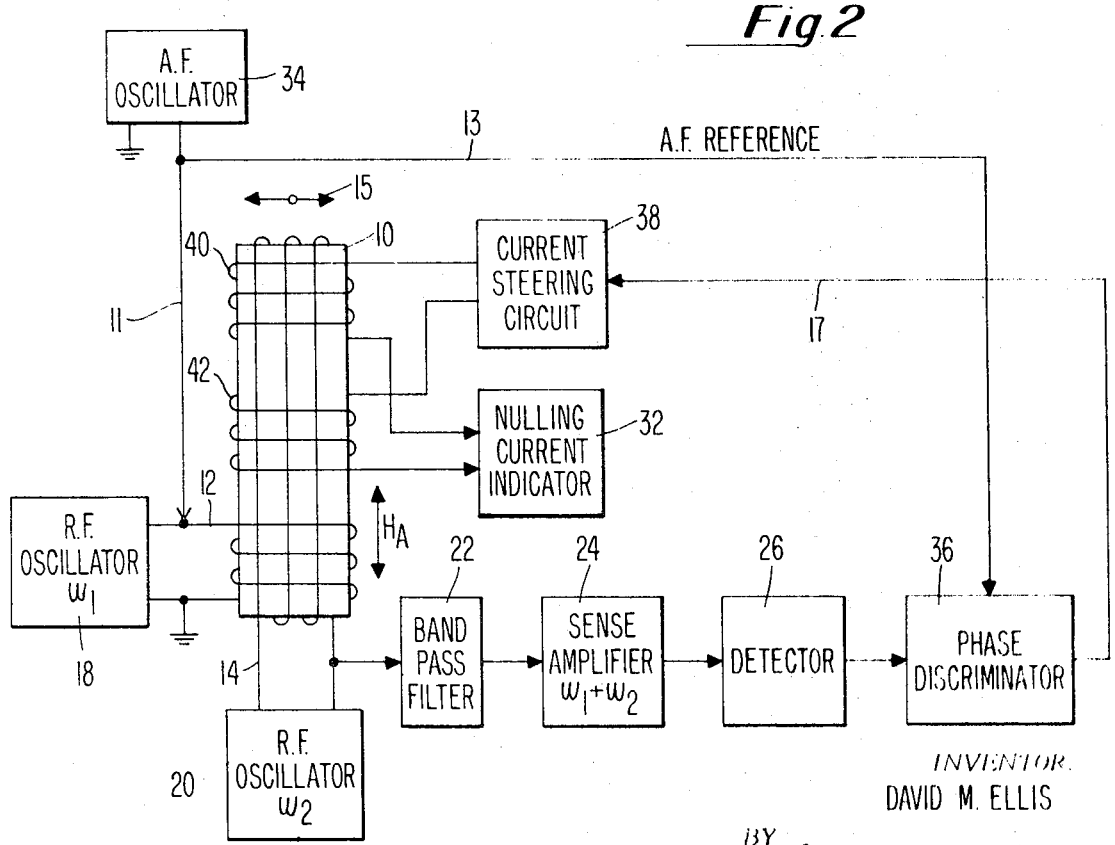
FIG. 2 is a block diagram representation of a second form of the present magnetometer in which the measurement of the applied field is automated by the use of a servo loop.

Considering FIG. 2, like reference characters have been employed for identical stages appearing in FIG. 1. Coupled to thin film element 10 are a hard direction winding 12 driven by RF oscillator 20. The output from the film is sensed by winding 14 and is coupled in turn to band-pass filter 22, sense amplifier 24, and detector 26. The magnetometer of FIG. 2 differs in one respect from that of FIG. 1 in that it includes an audio frequency oscillator 34 connected by way of line 11 to the hard direction winding 12. It should be understood that in practice, suitable means of coupling the audio frequency output to winding 12 should be employed. For example, a simple resistive coupling has been employed in an operative embodiment. It should also be apparent that if desired, an additional hard direction winding coupled to the thin film may be employed to carry the audiofrequency current. The frequency of the AF oscillator 34 is not critical, and a range of frequencies from 400 Hz. to 6 kHz. have been used successfully. The AF oscillator design is conventional and well within the skill of the electronic design engineer. The audiofrequency field applied to the thin film causes the film magnetization to rotate slightly and causes the sum radiofrequency output voltage appearing on winding 14 to vary at an audiofrequency rate. As in the case of the RF field, the audiofrequency field is controlled to produce a perturbation of the film which is incapable of switching action. The audio output from the detector 26 is applied to a phase discriminator 36. The reference phase for the discriminator comes from the AF oscillator 34 signal appearing on line 13. The DC output from the phase discriminator is applied by way of line 17 to a current steering circuit 38. Depending upon the phase discriminator output, this latter circuit causes the proper amplitudes of currents to flow respectively in a pair of hard direction windings 40 and 42 which are coupled to the thin film element and which are wound in phase opposition to each other.

In response to an applied field $H_A$, the current flow in windings 40 and 42 becomes unbalanced, and a hard direction field of proper magnitude and direction to cancel $H_A$, is automatically generated. The amplitude of the correcting current appearing on nulling current indicator 32 is linearly related to the applied field. If $H_A$ is not present, the current through windings 40 and 42 are substantially equal, and indicator 32 registers substantially zero. It should be noted that errors in the value of the correcting current registered by indicator 32, are related to the gain of the servo loop, and as is well known, such errors may be minimized by making the gain of the servo loop sufficiently great.

Figure 3A:
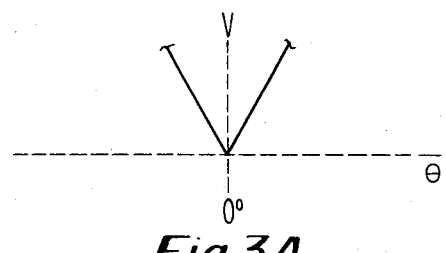
FIGS. 3A, 3B and 3C illustrate the manner in which the audio modulation present in the magnetometer of FIG. 2 generates the required correction currents for the measurement of the unknown external fields.
Figure 3B:
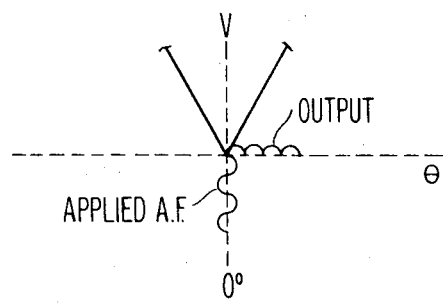
Figure 3C:
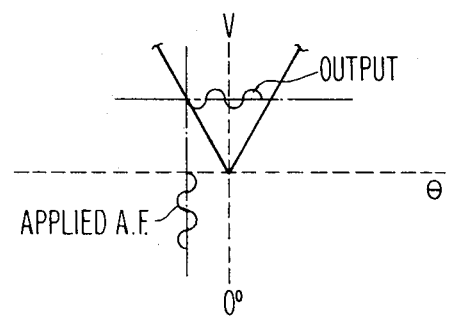

Referring now to FIGS. 3A, 3B and 3C, the manner in which the audio modulation generates the required correction current in windings 40 and 42 will be considered.

FIG. 3A represents in an idealized manner a graph of the sum-frequency output voltage of the thin film element in the vicinity of the null which occurs at the origin. The ordinate axis represents voltage amplitude, V; the abscissa, the angular displacement $\theta$, in degrees of the magnetization vector M on either side of the null position As stated hereinbefore, when the M-vector is parallel with the easy axis, the output voltage is zero, and when it is moved to either side of this null, the output voltage increases.

If it is assumed that the M-vector is in fact parallel with the easy axis, and that an audio frequency field is applied in the hard direction to the thin film element, M will rock back and forth through the null position. The output voltage corresponding to the applied audio frequency field is illustrated in FIG. 3B. Both the positive and negative excursions of input modulation are converted to positive excursions of output voltage at twice the frequency of the input. At the exact null, the lowest frequency present in the output voltage is the second harmonic of the drive frequency. There is no output at the drive frequency itself.

If under the influence of an applied field, the M-vector is rotated to a position to the left of the null, as illustrated in FIG. 3C, the output voltage now contains some fundamental frequency component. This voltage has a particular phase relationship to the input audio signal. If M were rotated instead to the right of the null position by an amount equal to that of the rotation to the left, the respective outputs at the fundamental frequency would be equal in amplitude but opposite in phase. Thus, the phase of the fundamental component of the output voltage relative to the phase of the applied hard direction field gives information about which side of the null position the M vector is located.

Figure 4:
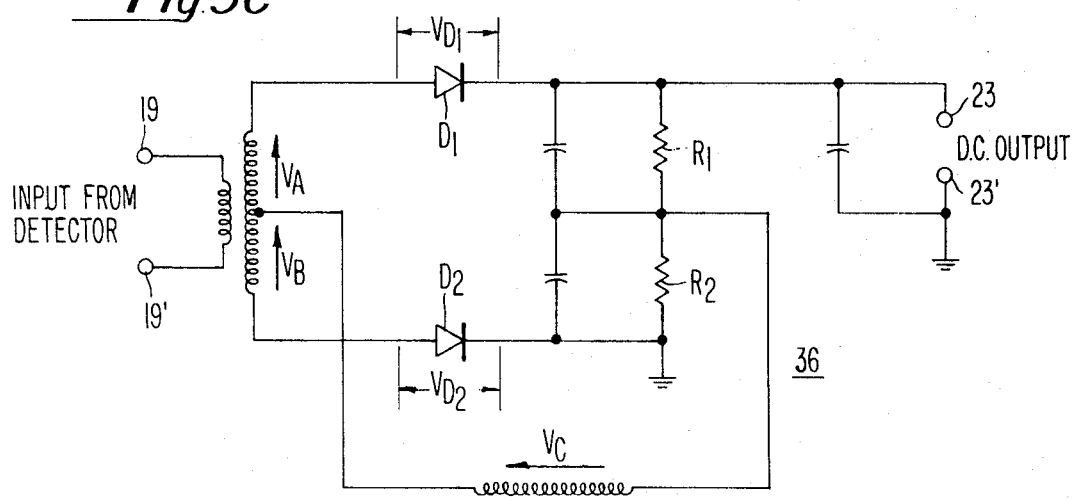
FIG. 4 is a schematic diagram of a Foster-Seely type discriminator for use as the phase discriminator in the magnetometer of FIG. 2.

In FIG. 2 the output from a detector stage 26 was depicted as being applied to a phase discriminator 36. FIG. 4 illustrates a phase discriminator similar to that of the well known Foster-Seeley discriminator. (Reported by D. E. Foster and S. W. Seeley in "Automatic Tuning Simplified Circuits and Design Practice," Proceedings of the IRE, Vol. 25, p. 289, March 1937). Although the circuit configuration of FIG. 4 has been used in an actual operative embodiment of the invention, it should be understood that other discriminator circuit arrangements may also be employed.

Figure 5A:
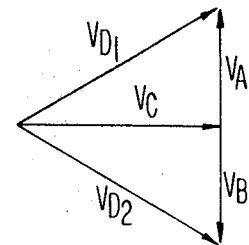
FIGS. 5A, 5B and 5C illustrate vectorially the operation of the phase discriminator of FIG. 4.
Figure 5B:
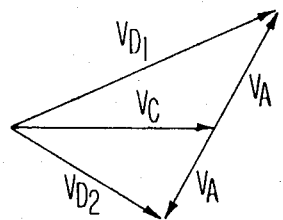
Figure 5C:
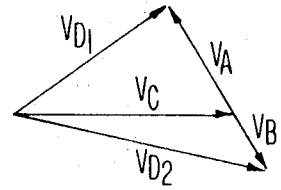

The operation of the phase discriminator may be understood from a consideration of the vector diagrams of FIG. 5A, 5B and 5C.

The output from the detector 26, when the magnetization moment, M, is not parallel with the easy axis, consists of a DC output voltage and an audio signal at the modulation frequency, the phase of which depends on which side of the null, the angular displacement of M from the easy axis occurs. The detector output is applied to terminals 19–19' of the phase discriminator 36. The reference audio signal derived from AF oscillator 34 is impressed across terminals 21–21' of the discriminator. The output voltage of the discriminator 36 appears across terminals 23–23'. This last voltage is the sum of the DC voltages developed across resistors $R_1$ and $R_2$ by current flow through diodes $D_1$ and $D_2$ respectively. FIG. 5A represents the condition which exists when the signal input on terminals 19–19' and the reference voltage on 21–21' are 90° out of phase. The AC voltages impressed respectively on both diodes $D_1$ and $D_2$ are equal and opposite so that the output across terminals 23–23' is zero.

FIG. 5B illustrates pictorially the situation where the phase of the input signal lags the reference signal. The $V_{D_1}$ across diode $D_1$ is greater than the voltage $V_{D_2}$ to exceed the negative voltage across $R_2$. A positive output voltage appears across output terminals 23–23'.

For a leading input signal phase, as illustrated in FIG. 5C, an operation opposite to that of FIG. 5B occurs the output voltage becomes negative. It is apparent from the foregoing that the phase information provided by the AF modulation of the thin magnetic film, results in a DC control voltage from the discriminator which has opposite polarities corresponding to opposite phases of the audio frequency signal.

FIG. 6 is a schematic diagram of a current steering circuit 38 which derives its input from the phase discriminator 36. In operation, output terminal 23 of the discriminator is connected to input terminal 25 of the current steering circuit. Terminals 23' and 25' respectively of the discriminator and steering circuit are connected in common to ground.

Current steering circuit 38 includes a pair of transistors, $TR_1$ and $TR_2$ and resistors $R_1'$ and $R_2'$. Current in the circuit is provided by the DC supplies $+V$ and $-V$, and the flow is directed through windings 40 and 42 which are inductively coupled to the thin film element 10. As noted hereinbefore in connection with FIG. 2, windings 40 and 42 are oppositely wound as indicated by the conventional dot notation. When the discriminator output is zero, that is, the input to $TR_1$ is substantially at ground potential, the conduction of both transistors $TR_1$ and $TR_2$ is essentially balanced. Equal currents flow respectively through windings 40 and 42 and the magnetic fields applied to element 10 as a result of such currents are equal and opposite. If the output voltage appearing on terminals 23–23' of discriminator 36 is at some positive level as a result of an external applied field $H_A$, this positive voltage appearing across terminals 25–25' of the current steering circuit tends to diminish the conduction of transistor $TR_1$. Current flow through winding 40 decreases, while the current through winding 42 increases—the total current flow in the current steering circuit remaining substantially constant. A correcting field of one sense or polarity is applied to the film element 10 to cancel $H_A$. Alternately, a negative potential applied to $TR_1$ by the phase discriminator, tends to increase the conduction of $TR_1$, causing increased current flow through winding 40 at the expense of current flow through winding 42. This latter condition results in a correcting field of opposite sense to that produced by a positive discriminator output, being applied to the film element 10.

Nulling current indicator 32 provides a measure of the current flow through windings 40 and 42 as a function of the difference voltages developed across resistors $R_1{'}$ and $R_2{'}$. In the absence of $H_A$, the voltages across $R_1{'}$ and $R_2{'}$ are substantially equal and the indicator 32 reads substantially zero. Unbalance in the voltages across $R_1$ and $R_2$ is indicative of the unbalance in correcting currents through windings 40 and 42. The reading of indicator 32 is indicative of the direction and strength of the $H_A$ field which created the current unbalance.

There has been described in the foregoing, a magnetometer using a thin film element sensitive to applied fields along a single axis. The principles involved in the latter, are useful in the mechanization of an instrument sensitive to magnetic fields in three orthogonal directions. FIG. 7 illustrates such an instrument.

In FIG. 7, three magnetic film sensors, $10_X$, $10_Y$ and $10_Z$ each similar to the element 10 described hereinbefore, are oriented with their easy axes mutually perpendicular as indicated by the vectors 35. Common RF stages including RF oscillators 18 and 20 providing respectively signals of frequencies $\omega_1$ and $\omega_2$, are used to drive all three film elements. The RF oscillator 20 output is applied to winding 14 which is common to all three elements and has its coil axis oriented along the easy axis of each of the elements. The RF oscillator 18 output is applied to a parallel arrangement of windings $12_X$, $12_Y$, and $12_Z$, each winding having its coil axis positioned transverse to the easy axis of the element on which it is wound. Different audio modulation frequencies are provided respectively for the elements by audiofrequency oscillators $34_X$, $34_Y$, and $34_Z$, the respective outputs of which are applied to windings $12_X$, $12_Y$, and $12_Z$. The output signals from the three magnetic elements are sensed on the common easy direction winding 14 (The RF oscillator 20 drive winding) and are passed in common through the band-pass filter 22, sense amplifier 24 and detector 26. The output of the detector 26 is applied in common to three phase discriminators, designated by reference characters $36_X$, $36_Y$, and $36_Z$. Each of these discriminators receives a reference frequency from one of the audiofrequency oscillators, and is tuned to operate upon only that information received from the thin film element whose modulation is at the reference frequency. The outputs of the phase discriminators $36_X$, $36_Y$ and $36_Z$ are applied respectively to current steering circuits, $38_X$, $38_Y$ and $38_Z$. Each of the latter circuits drives current through a pair of correction windings designated $44_X$, $44_Y$ and $44_Z$, by way of nulling current indicators $32_X$, $32_Y$ and $32_Z$, to effect a cancellation of the field applied to a particular one of the thin film elements. In practice, it is convenient to utilize three mutually perpendicular sets of Helmholtz coils for the correction windings. A set of coils is arranged to provide a correction hard axis field to a particular film element. It should be noted that for optimum performance, the three sets of Helmholtz coils are arranged to surround all three thin film sensors, and as a result of the mutual inductive coupling, the films always operate in a zero field environment. For example, an applied field $H_A$ directed parallel with the hard axis of film $10_Y$, represents a like magnitude easy axis field $H_A$, applied to film $10_X$. Due to the action of phase discriminator $36_Y$, the Y correction windings, $44_Y$, provide a hard direction field to element $10_Y$ in a direction to cancel $H_A$. Because of the inductive coupling between the Y correction windings, $44_Y$, and thin film element $10_X$, the external easy axis field is likewise cancelled by the action of the Y correction field.

Indications of the magnitude and polarity of the correcting fields along the respective sensitive axes of the magnetometer are provided by nulling current indicators $32_X$, $32_Y$ and $32_Z$, in the same manner as that described in connection with nulling current indicator 32 of FIG. 6.

In conclusion, it should be mentioned that in the actual measurement of very small magnetic fields, the present magnetometer, operating in the mode described herein, exhibited a high degree of sensitivity, linearity and stability: thereby performing a function hitherto reserved almost exclusively TO complicated instruments and measuring techniques.

What is claimed is:

1. A magnetometer comprising ferromagnetic material capable of assuming opposed states of residual flux density along a preferred axis of magnetization, said material being magnetized substantially in a predetermined one of said states, and existing substantially as a single large domain of said predetermined state, alternating current source means, winding means disposed on said ferromagnetic material in fixed relationship to said preferred axis of magnetization, said winding means being adapted to be energized by said alternating current source means for applying dual frequency alternating magnetic fields concurrently to said material in directions respectively transverse to and parallel with said preferred axis, said dual magnetic fields being controlled in magnitude such that the magnetization of said material is disturbed but not permanently altered in state, the magnetic moment of said material being displaced from its position parallel with said preferred axis in response to the external magnetic field environment to which said material is subjected in a direction transverse to its preferred axis, means for sensing a preselected combinatorial frequency component of the magnetic flux generated by said dual frequency magnetic fields, the amplitude and phase of said frequency component being a function of the degree of displacement of the magnetic moment from the preferred axis of said material, said frequency component being zero when said magnetic moment lies parallel to the preferred axis of said material, correction winding means inductively coupled to said material and being so disposed therewith as to link the magnetic flux of said material in a direction transverse to said preferred axis, means operatively connected to said correction winding means for causing current flow therethrough, said last-mentioned current having an amplitude and polarity such that the correction magnetic field generated thereby and applied to said material is substantially equal and opposite to said magnetic field environment, said magnetic moment being restored by said correction field to its position parallel to the preferred axis of said material, the amplitude and polarity of the current flow in said correction winding means being indicative of the magnitude and direction of said external field environment.

2. A magnetometer as defined in claim 1 further characterized in that said ferromagnetic material is a thin film of nickel-iron alloy having a thickness of not more than 5,000 Angstrom units.

3. A magnetometer as defined in claim 1 wherein said winding means comprise first and second windings inductively coupled to said material and being so disposed therewith as to respectively link the magnetic flux of said material in directions transverse to and parallel with said preferred axis, said alternating current source means comprising first and second sources of respective different fixed frequencies of alternating current, said first and second windings being adapted to be energized respectively by said first and second source of alternating current.

4. A magnetometer as defined in claim 3 wherein said first and second sources of alternating current are individual radiofrequency oscillators.

5. A magnetometer as defined in claim 4 wherein said sensed combinatorial frequency component is the sum-frequency component of the flux generated by said radiofrequency oscillators.

6. A magnetometer as defined in claim 5 wherein said means for sensing said sum-frequency component includes said second winding means, a band-pass filter coupled to said second winding means and adapted to pass said sum-frequency component, means coupled to the output of said filter for amplifying and detecting said sum-frequency component, and null indicator means for displaying the detected component.

7. A magnetometer as defined in claim 6 wherein said means operatively connected to said correction winding means for driving current therethrough comprises a DC current source.

8. A magnetometer as defined in claim 7 further including a nulling current indicator operatively connected to said correction winding means for indicating the amplitude and polarity of the current flowing therethrough.

9. A magnetometer comprising a ferromagnetic thin film element capable of assuming opposed states of residual flux density along an easy direction of magnetization, said element being magnetized substantially in a predetermined one of said states and acting substantially as a single large domain of said predetermined state, first and second windings disposed about said thin film element in fixed relationship to said easy directions of magnetization and being inductively coupled to said thin film element in a manner to link the magnetic flux respectively in the hard and easy directions of magnetization, first and second RF oscillators for providing respectively radiofrequency currents of different fixed frequencies, said first and second windings being adapted to be energized respectively by said first and second RF oscillators whereby dual radiofrequency fields are applied concurrently to said element, said radiofrequency fields being controlled in magnitude so as to limit the perturbation of the magnetization of said element to small angular rotations incapable of altering said single domain configuration, the angular displacement of the M magnetization vector of said element from the easy direction of magnetization being a function of the external magnetic field applied to the element along its hard direction of magnetization, means for applying a hard direction audiofrequency field to said element in concurrence with said dual radiofrequency fields, said audiofrequency field being controlled in magnitude such that the magnetization of said element is disturbed but not permanently altered in state, means including said second winding for sensing a preselected combinatorial frequency component of the magnetic flux generated by said radiofrequency magnetic fields and modulated by said audiofrequency magnetic field, the amplitude and phase characteristic of said modulated frequency component being a function of the degree and polarity of the angular displacement of the magnetization vector from the easy direction, correction winding means inductively coupled to said element in a manner to link the magnetic flux of said element in the hard direction of magnetization, current steering means for coupling said correction winding means to said means for sensing the modulated frequency component in a closed circuit path, said current steering means selectively providing current flow through said correction winding means as a function of said sensed frequency component, thereby generating a correction magnetic field which when applied to said element substantially cancels said external magnetic field, the nature of the current flow in said correction winding mans being indicative of the magnitude and direction of said external field.

10 A magnetometer as defined in claim 9 further characterized in that said ferromagnetic thin film element is a nickel-iron alloy composed substantially of 83 percent nickel and 17 percent iron, and having a thickness of approximately 2000 Angstrom units.

11. A magnetometer as defined in claim 9 wherein said sensed combinatorial frequency component is the sum-frequency component of the flux generated by said RF oscillators.

12. A magnetometer as defined in claim 9 wherein said means for applying a hard direction audiofrequency field to said element includes an AF oscillator coupled to said first winding for causing audiofrequency current flow therethrough.

13. A magnetometer as defined in claim 9 wherein said correction winding means comprise a pair of correction windings wound in opposite phase and connected in parallel with respect to each other, the polarity and magnitude of said correction magnetic field applied to said element being a function of the respective amplitudes of the currents flowing through said correction windings at any given time.

14. A magnetometer as defined in claim 12 wherein said means for sensing said modulated frequency component which includes said second winding also comprises s bandpass filter coupled to said second winding for passing said component, a sense amplifier and detector coupled to the output of said filter for amplifying and detecting said component, and a phase discriminator operatively connected to receive the detector output signal, means coupling the output of said AF oscillator to said phase discriminator to furnish a reference signal therefor, said phase discriminator providing as its output a DC control signal which is related to the phase of the audiofrequency modulation of said frequency component, and means for applying said DC control signal to said current steering means 15. A magnetometer as defined in claim 13 wherein said current steering means comprises two parallel current paths electrically connected between sources of DC current, each of said paths including in series a current amplifying device, one of said correction windings, and a resistor.

16. A magnetometer as defined in claim 15 further including a nulling current indicator connected across the resistors in the respective parallel current paths for indicating the difference voltages thereacross and providing a measure of the currents flowing respectively through said correction windings, the indicator reading providing information on the direction and strength of said external field.

17. A magnetometer comprising a plurality of thin magnetic film elements, each element being capable of assuming opposed states of residual flux density along an easy direction of magnetization, each element being magnetized substantially in a predetermined one of said states and acting substantially as a single large domain of said predetermined state, means for orienting said elements with their easy directions of magnetization in mutually orthogonal relationship.

alternating current source means, winding means disposed on said elements in fixed relationship to the respective easy directions of magnetization thereof, said winding means being adapted to be energized by said alternating current source means for applying dual radiofrequency fields concurrently to each of said elements in respective hard and easy directions of magnetization.

means for applying a different hard direction audiofrequency field to each of said elements, means for sensing in each of said elements a sum-frequency component of the magnetic flux generated by said dual radiofrequency fields and modulated by the particular audiofrequency field applied to the element, the amplitude and phase characteristic of said modulated sum-frequency component in each of said elements being a function of the angular displacement of the M-vector within the element in response to an external magnetic field component applied to the element along its hard direction of magnetization, correction winding means inductively coupled to each of said elements in a manner to link the magnetic flux of the element in the hard direction of magnetization, each said correction winding means being positioned with respect to the other of said plurality of elements such that mutual inductive coupling exists thereamong, a current steering circuit associated with each of said elements for coupling said correction winding means to said means for sensing said modulated sum-frequency component in a closed circuit path, each said current steering circuit selectively providing current flow through its associated correction winding means as a function of said modulated sum-frequency component, thereby generating a correction magnetic field which when applied to a given element substantially cancels the external magnetic field component applied to said given element, the nature of the current flow in the correction winding means associated with said given element being indicative of the magnitude and direction of the field component applied thereto, and indicator means for providing a measure of said current flow in each said correction winding means.

18. A magnetometer as defined in claim 17 wherein said winding means comprise a first plurality of windings associated respectively with said plurality of elements, each of said last-mentioned windings being disposed to link the magnetic flux of one of said plurality of elements in the hard direction of magnetization, and a second winding common to said plurality of elements and being disposed to link the magnetic flux in the easy direction in each said element, said alternating current source means comprising first and second sources of respective different fixed radiofrequency currents, said first plurality of windings and said second winding being adapted to be energized respectively by said first and second sources of radiofrequency currents.

19. A magnetometer as defined in claim 18 wherein said means for applying a different hard direction audiofrequency field to each of said elements comprises a plurality of AF oscillators coupled respectively to said first plurality of windings for causing audiofrequency currents to flow therethrough in concurrence with said radiofrequency currents from said first source.

20. A magnetometer as defined in claim 19 wherein said means for sensing a modulated sum-frequency component in each said element comprises said second winding, a band-pass filter coupled to said second winding to pass the modulated sum-frequency components generated within said plurality of elements, a sense amplifier and detector coupled to the output of said filter for amplifying and detecting said last-mentioned components, a plurality of phase discriminators, said phase discriminators being operatively connected in common to receive the detector output signals, means coupling the outputs of said plurality of AF oscillators respectively to said phase discriminators for furnishing reference signals therefore, each of said discriminators being tuned to operate upon the sum-frequency component whose modulation is at the frequency of said reference signal and to provide as its output a DC control signal which is related to the phase of the audiofrequency modulation of the sum-frequency component, and means for applying the plurality of output DC control signals respectively to the current steering circuits.

* * * * *

PO-1050
(5/69)

UNITED STATES PATENT OFFICE
CERTIFICATE OF CORRECTION

Patent No. 3,619,772      Dated November 9, 1971

Inventor(s) David M. Ellis

It is certified that error appears in the above-identified patent and that said Letters Patent are hereby corrected as shown below:

Col. 6, line 33, after "The" and before "$V_{D_1}$" insert --voltage--; Col. 6, line 34, after "$V_{D_2}$" insert --across diode $D_2$, which causes the positive voltage across $R_1$--;

Col. 6, line 38, after "occurs" insert --and--;

Col. 7, line 67, after "field" insert --$H_{A'}$--;

Col. 11, line 3, "flaw" should read --flow--.

Signed and sealed this 18th day of April 1972.

(SEAL)
Attest:

EDWARD M. FLETCHER, JR.
Attesting Officer

ROBERT GOTTSCHALK
Commissioner of Patents